United States Patent [19]

Varano

[11] Patent Number: 5,226,585
[45] Date of Patent: Jul. 13, 1993

[54] DISPOSABLE BIODEGRADABLE INSULATED CONTAINER AND METHOD FOR MAKING

[75] Inventor: Richard Varano, Forestville, Conn.

[73] Assignee: Sherwood Tool, Inc., Kensington, Conn.

[21] Appl. No.: 794,988

[22] Filed: Nov. 19, 1991

[51] Int. Cl.$^5$ .............................................. B65D 3/22
[52] U.S. Cl. .................................. 229/1.5 B; 493/58; 493/59; 493/111; 493/903
[58] Field of Search .................. 229/1.5 B, 4.5, 90, 229/1.5 H; 215/12.1, 100 R; 220/441, 445; 493/58, 59, 111, 943

[56] References Cited

U.S. PATENT DOCUMENTS

| | | | |
|---|---|---|---|
| Re. 25,618 | 7/1964 | Goodman | 229/1.5 B |
| 1,771,765 | 7/1930 | Benson | 229/1.5 H |
| 2,266,828 | 12/1941 | Sykes | 229/1.5 B |
| 2,617,549 | 11/1952 | Egger | 215/100 R |
| 3,194,468 | 7/1965 | Baron | 229/1.5 B |
| 3,237,834 | 3/1966 | Davis et al. | 229/1.5 B |
| 3,443,714 | 5/1959 | Edwards | 220/441 |
| 3,443,715 | 5/1969 | Edwards | 220/441 |
| 3,456,860 | 7/1969 | Janninck | 229/1.5 B |
| 3,503,310 | 3/1970 | Goetz | 229/1.5 B |
| 3,627,166 | 12/1971 | Walter | 220/441 X |
| 3,908,523 | 9/1975 | Shikaya | 229/1.5 B |
| 4,410,578 | 10/1983 | Miller | 220/445 |
| 4,548,349 | 10/1985 | Tunberg | 229/1.5 H |
| 4,836,400 | 6/1989 | Chaffey et al. | 229/1.5 B |
| 5,092,485 | 3/1992 | Lee | 229/1.5 B X |

FOREIGN PATENT DOCUMENTS

| | | | |
|---|---|---|---|
| 677719 | 1/1964 | Canada | 229/1.5 B |
| 371918 | 6/1990 | European Pat. Off. | 229/1.5 B |
| 2331005 | 1/1975 | Fed. Rep. of Germany | 229/1.5 B |
| 568053 | 9/1975 | Switzerland | 229/1.5 B |

Primary Examiner—Allan N. Shoap
Assistant Examiner—Christopher McDonald
Attorney, Agent, or Firm—McCormick, Paulding & Huber

[57] ABSTRACT

A disposable biodegradable insulated container includes a smooth walled frustoconical inner cup received within a frustoconical wrap. A series of angularly spaced apart fluted indentations formed in the outer surface of the wrap extend longitudinally of the wrap and terminate in spaced relation to the upper and lower edges of the wrap. The indentations define corresponding angularly spaced apart and inwardly directed ribs on the inner surface of the wrap which engage the sidewall and maintain portions of the wrap intermediate the ribs in spaced relation to the sidewall. The upper and lower marginal portions of the wrap are adhered to the sidewall. The thickness of the wrap is greater than the distance between the inner surface of the wrap and the outer surface of the sidewall measured from the central axis of the container in a radial direction and between the ribs. A method for making the container is also disclosed.

11 Claims, 2 Drawing Sheets

DISPOSABLE BIODEGRADABLE INSULATED CONTAINER AND METHOD FOR MAKING

BACKGROUND OF THE INVENTION

This invention relates in general to disposable containers and deals more particularly with an improved disposable biodegradable insulated container particularly adapted to contain hot liquids and to a method for making such a container.

Insulated containers made from plastic material for handling hot liquids such as beverages, soup and the like have enjoyed great popularity, particularly in the fast food industry. However, such containers, and particularly those molded from foam plastic materials, are not biodegradable, present difficult disposal problems, and must be separated from recyclable waste materials before the latter waste materials may be reprocessed. Recent legislative trends prohibiting the use of such environmentally unfriendly products have created a need for improved disposable containers which are both recyclable and biodegradable.

Disposable insulated paper cups which have heretofore been available are generally of a dual wall type or comprise an inner container and an outer covering of corrugated material having a deeply furrowed outer surface characterized by a series of contiguous curved ridges and hollows. A typical example of such a cup assembly is found in Shikaya U.S. Pat. No. 3,908,523. The latter cup assembly includes a substantially conventional cup received within an outer corrugated sleeve. While such a cup assembly may possess the desired insulating qualities, the outer surface of the assembly is not particularly suited to carry printed material, such as a listing of the ingredients in or directions for use of a product packaged in the container. Further, such a cup assembly is relatively expensive to manufacture, because a substantial quantity of paper is required to make the corrugated outer sleeve. A relatively large quantity of adhesive is also required to make each cup assembly, since it is generally necessary to secure all of the corrugations to the surface of the inner container. The exposed corrugations which define the outer surface of the cup assembly are easily damaged or crushed by ordinary handling which may result in an unsalable product. Further, the exposed corrugations tend to cause jamming when a cup assembly is nested within another cup assembly of like kind.

Accordingly, it is the general aim of the present invention to provide an improved disposable biodegradable insulated container for low cost manufacture and which is suitable for carrying printed material which may be easily read, may be nested without difficulty within another container of like kind, and which closely resembles a conventional smooth surfaced container while possessing insulating qualities equal to or better than those of comparable containers.

SUMMARY OF THE INVENTION

In accordance with the invention a disposable biodegradable insulated container is provided which includes a carrier having an open upper end and including a sidewall formed from a biodegradable blank, a bottom wall, and means for retaining the bottom wall in substantially liquid tight engagement with the sidewall. A biodegradable wrap or sleeve of uniform thickness coaxially surrounds the sidewall and has upper and lower edges and a series of spaced apart elongate shallow fluted indentations angularly spaced about the axis of the sidewall. Each of the indentations extends in a direction defined by the intersection of an axial plane of the sidewall and the wrap. The indentations terminate in spaced relation to the upper and lower edges of the wrap. Each indentation defines a corresponding longitudinally extending and inwardly directed rib projecting from the inner surface of the wrap and engaging the sidewall. Adjacent ribs cooperate with associated upper and lower marginal portions of the wrap extending between the adjacent ribs, an associated portion of the outer surface of the sidewall, and an associated portion of the inner surface of the wrap to define a chamber between the wrap and the sidewall. Means is provided for adhering at least the upper and lower marginal portions of the wrap to the sidewall. Adjacent indentations cooperate with associated upper and lower marginal portions of the wrap extending between the adjacent indentations and bound a portion of another surface of revolution defined by a smooth outer peripheral surface portion of the wrap.

DETAILED DESCRIPTION OF PREFERRED EMBODIMENT AND METHOD

Figure 1:
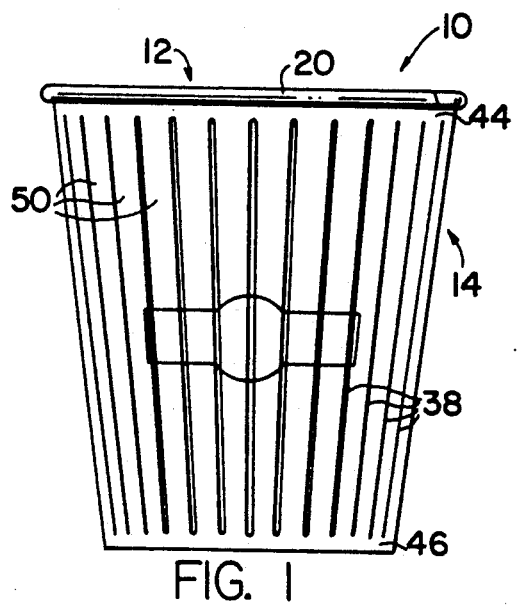
FIG. 1 is a side elevational view of a disposable biodegradable insulated container embodying the present invention.

Turning now to the drawing, an insulated disposable container embodying the present invention is indicated generally by the reference numeral 10. The illustrated container 10 is made from biodegradable material, preferably paper, and essentially comprises a smooth walled inner cup or carrier indicated generally at 12 and an outer wrap designated generally by the numeral 14. The illustrated container 10 has a frustoconical configuration to facilitate nesting within another container of like kind.

Figure 3:
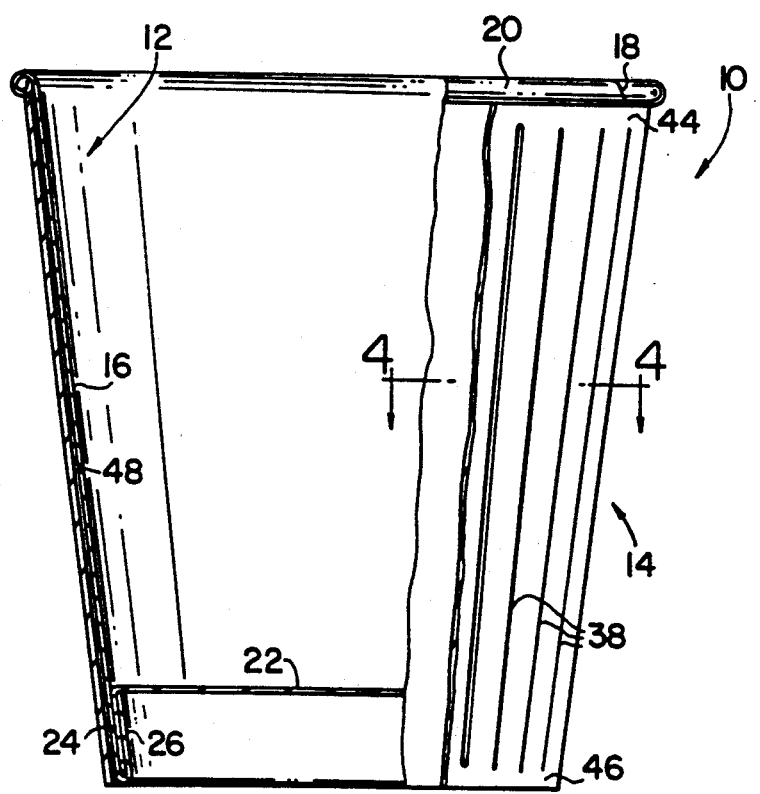
FIG. 3 is a somewhat enlarged side elevational view shown partially in axial section.

The carrier 12 is made from a biodegradable material, preferably paper board, virgin stock solid bleach sulfite having a single ply coating of polyethylene on its inner surface being presently preferred. The carrier 12 comprises a substantially conventional frustoconical cup which has a sidewall 16 formed by joining the opposite marginal end portions of a sidewall blank in overlapping face-to-face relation to each other to form a seam 18. The upper end portion of the sidewall blank may be rolled outwardly to form an annular bead 20 of generally circular cross-section as shown or may be turned outwardly and downwardly and flattened to form a rim which surrounds the upper end of the cup 12. A circular bottom wall, indicated at 22, is made from another paper blank and includes a depending annular skirt 24. The skirt is attached in face-to-face relation to the inner surface of the sidewall 16. The lower marginal portion of the sidewall blank indicated at 26 and shown in FIG. 3, is rolled and formed inwardly and upwardly into face-to-face relation with the inner surface of the skirt 24 and joined to the skirt by suitable means, whereby the bottom 22 is connected in substantially liquid tight engagement to the sidewall. The bottom wall 22 is spaced upwardly from the lower edge of the sidewall 16, for a purpose which will be hereinafter evident.

Figure 5:
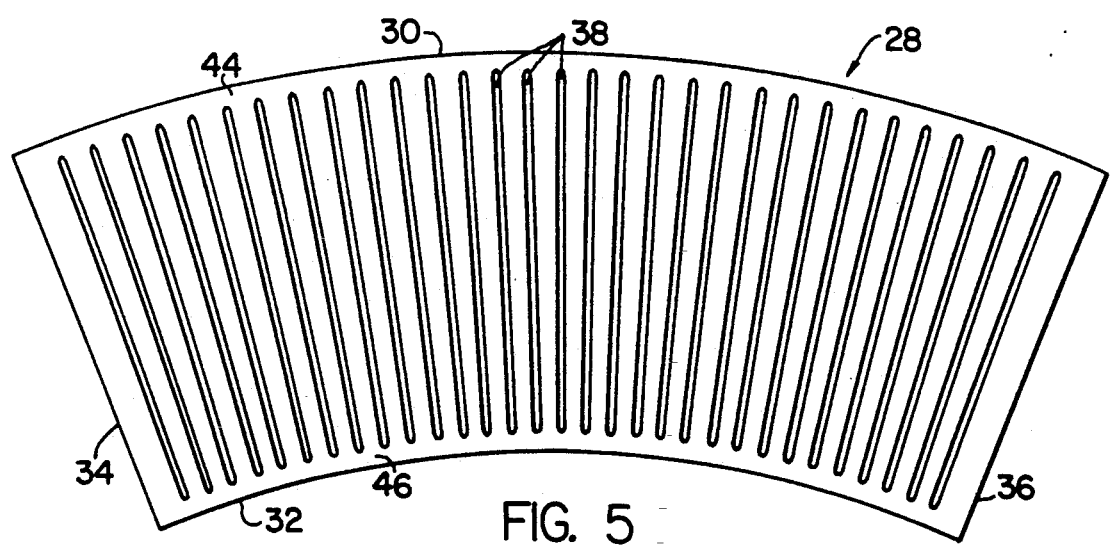
FIG. 5 is a plan view of a wrap blank used in making the container.

The wrap 14 is formed from a blank of biodegradable material, recycled paper being presently preferred for this purpose. Thus, a wrap blank, shown in FIG. 5 and indicated generally by the reference numeral 28, is formed by a cutting or blanking operation and has arcuate upper and lower edges indicated at 30 and 32, respectively, which have a common center and differing radii of curvature. The wrap blank 28 is further defined by radially extending opposite end edges 34 and 36. The blank is completed by forming or scoring a plurality of spaced apart and radially extending shallow indentations 38,38 in one surface of the blank 28, thereby producing corresponding radially extending ribs 40,40 projecting from the opposite surface of the blank and terminating the indentations 38,38 and the ribs 40,40 in radially spaced relation to the upper and lower marginal edges 30 and 32 substantially as shown in FIG. 5. Preferably, the blank 28 is cut and the depressions 38,38 and ribs 40,40 are simultaneously formed on the wrap blank 28 by a single blanking operation.

Figure 2:
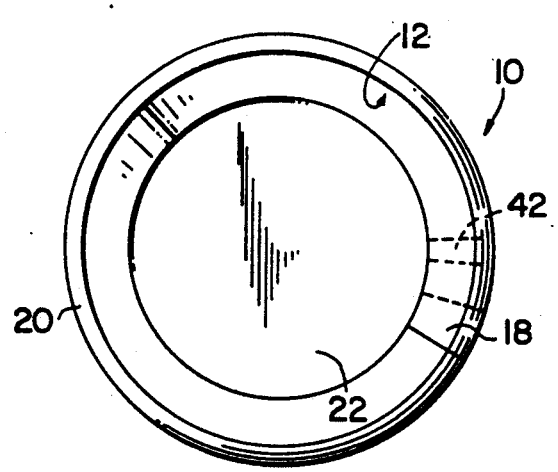
FIG. 2 is a top plan view of the container of FIG. 1.
Figure 4:
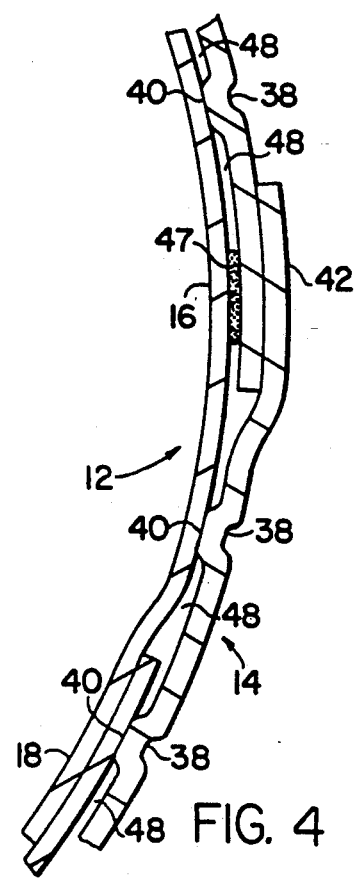
FIG. 4 is a somewhat further enlarged fragmentary sectional view taken generally along the line 4—4 of FIG. 3.

The container 10 is completed by wrapping the completed wrap blank 28 around the cup 12 bringing the ribs 40,40 into contacting engagement with the outer surface of the sidewall 16, overlapping the opposite marginal end portions of the blank 28 and adhering the overlapping marginal end portions in face-to-face relation to each other and to the sidewall 16 to form another seam indicated at 42 and best shown in FIGS. 2 and 4. The wrapping operation is performed so that the resulting wrap seam 42 is out of registry with the cup seam 18. The upper edge 30 is positioned generally adjacent the associated lower portion of the bead 20. The assembly is completed by adhering to the sidewall 16 the upper and lower marginal portions of the blank 28. In FIGS. 3 and 5 the upper and lower marginal portions are shown and indicated at 44 and 46, respectively.

The steps of wrapping the wrap, overlapping the opposite ends of the wrap, adhering the overlapping ends to each other and to the sidewall, and adhering the upper and lower marginal portions of the wrap to the sidewall are preferably performed while the cup 12 is supported on a mandrel. The scam 42 may also be adhered to the sidewall 16 as indicated at 47 in FIG. 4.

Further considering the assembled or finished container 10, it will be noted that the lower edge of the wrap 28 is disposed in registry with the bottom edge of the sidewall 16, as best shown in FIG. 3. The indentations 38,38 are preferably substantially equangularly spaced about the axis of the cup 12. However, some slight variation in spacing may occur in the region of the seam 42 where a slightly wider spacing may be provided Preferably, the indentations, which are of relatively narrow width are spaced at least ten degrees apart about the axis of the cup 12, however, a twelve degree spacing is preferred.

Adjacent ribs 40,40 cooperate with associated upper and lower marginal portions 44 and 46 which extend between the adjacent ribs, an associated portion of the outer surface of the sidewall 16, and an associated portion of the inner surface of said wrap 14 to define a chamber 48 between said wrap 14 and said side wall 16. Adjacent indentations 38,38 cooperate with associated upper and lower marginal portions 44 and 46 which extend between the adjacent indentations to bound a portion of a surface of revolution defined by a smooth outer peripheral surface portion of the wrap 14, the outer peripheral surface portion having the general shape of an isosceles trapezoid and being indicated at 50 in FIG. 1.

The board caliper or thickness of the paper stock used in making the container 10 may vary. In a typical container, such as the container 10, and having a capacity of 15 fluid ounces (443.7 ml) and a volume of 27.07 cubic inches (443.73 cu/cm) the side wall 16 is preferably formed from paper board stock having a board caliper or thickness of 0.014 inches whereas as the thickness of the wrap blank stock is 0.016 inches. The provision of the wrap enables some saving of paperboard stock in the sidewall of the cup 12 without sacrificing the structural integrity of the finished container 10.

The depth of the indentations 38,38 and spacing between the inner surface of the wrap 14 and the outer surface of the sidewall 16 in the presently preferred embodiment is approximately 0.013 inches as measured radially from the central axis of the container 10 intermediate the ribs 40,40. It will be noted that the thickness of the outer wrap is greater than the latter spacing in the presently preferred structure. Thus, the total thickness of the sidewall of the container 10, that is the distance between the inner surface of the sidewall 16 and the outermost surface of the wrap 14 is substantially minimized while providing for reasonable air spaces or insulating chambers between the wrap 14 and the sidewall 16. This arrangement enables convenient nesting without requiring unreasonable vertical spacing between the bottom wall 22 and the bottom edge of the container 10, the bottom wall being raised to prevent jamming when one container 10 is nested within another container of like kind.

Typically, the width of each indentation 38 is approximately 0.030 inches, whereas the spacing between adjacent indentations is approximately 0.254 inches. Thus, the spacing between adjacent indentations 38,38 is at least equal to 8 times the width of an individual indentation 38.

The illustrated cup 10, hereinbefore described, is approximately 95% biodegradable, all of the materials being environmentally friendly with the exception of the single ply polyethylene coating which is or may be applied to the inner surface of the cup 12. The illustrated container 10 is microwaveable, and conserves material. Even relatively fine print, such as a listing of product ingredients, is readily readable when imprinted on the outer surface of the wrap. The shallow indentations 38,38 formed in the wrap provide a convenient gripping surface without detracting from the appearance of the container which, in all respects, closely resembles a conventional paper cup of like size.

It has been found, for example, that when a hot liquid, such as coffee at 180 degrees fahrenheit, is introduced into the cup the outer surface of the cup will attain a maximum temperature, approximately 140 degrees, within approximately 30 seconds and may be comfortably handled.

I claim:

1. A disposable biodegradable insulated container comprising a carrier having an open upper end and including a sidewall defining inner and outer surfaces of revolution and formed from a biodegradable blank, said sidewall having a bottom edge, a bottom wall, spaced a substantial distance above said bottom edge and means for retaining said bottom wall in substantially liquid tight engagement with said sidewall, and a biodegradable wrap having a substantially uniform thickness and coaxially surrounding said sidewall, said wrap having an upper edge and a lower edge disposed in registry with said bottom edge, a series of spaced apart elongate shallow fluted indentations formed in the outer surface of said wrap and angularly spaced about the central axis of said sidewall, said wrap having a thickness greater than the depth of said indentations, each of said indentations extending in a direction defined by the intersection of an axial plane of said sidewall and said wrap, said indentations terminating in spaced relation to said upper and lower edges of said wrap, each of said indentations defining a corresponding longitudinally extending and inwardly directed rib projecting from the inner surface of said wrap and engaging said sidewall, adjacent ribs cooperating with associated upper and lower marginal portions extending between said adjacent ribs, an associated portion of the outer surface of the sidewall, and an associated portion of the inner surface of said wrap and defining a chamber between said wrap and said sidewall, and means for adhering the upper and lower marginal portions of said wrap to said sidewall, adjacent indentations cooperating with associated upper and lower marginal portions of said wrap extending between said adjacent indentations and bounding a portion of another surface of revolution defined by a smooth outer peripheral surface portion of said wrap, said other surface of revolution having an axis coincident with the axis of said sidewall.

2. A disposable biodegradable insulated container as set forth in claim 1 wherein said sidewall and said wrap are frustoconical and said outer peripheral portion has the general shape of an isosceles trapezoid.

3. A disposable biodegradable insulated container as set forth in claim 1 wherein said carrier has an annular bead surrounding said open upper end and said upper edge is disposed generally adjacent an associated lower portion of said bead.

4. A disposable biodegradable insulated container as set froth in claim 1 wherein the thickness of said wrap is at least as great as the spacing between the inner surface of said wrap and the outer surface of said sidewall measured in a radial direction intermediate said ribs.

5. A disposable biodegradable insulated container as set forth in claim 1 wherein both said wrap and said carrier are made from paper.

6. A disposable biodegradable insulated container as set forth in claim 1 wherein the thickness of said wrap is greater than the thickness of said sidewall.

7. A disposable biodegradable insulated container as set forth in claim 1 wherein said indentations are substantially equangularly spaced about the axis of said carrier.

8. A disposable biodegradable insulated container as set forth in claim 7 wherein the angular spacing between said indentations is at least ten degrees.

9. A disposable biodegradable insulated container as set forth in claim 7 wherein said angular spacing between said indentations is from 10 to 12 degrees.

10. A disposable biodegradable insulated container comprising a substantially frustoconical carrier having an open upper end and substantially smooth inner and outer surfaces and including a frustoconical sidewall formed from a paper blank of substantially uniform thickness and having a seam defined by overlapping opposite marginal end portions of said blank, said blank defining an outwardly directed annular bead having a circular cross-section and surrounding said open upper end, a bottom wall spaced upwardly from the bottom edge of said sidewall and having a depending annular skirt engaged with an associated marginal portion of the inner surface of said sidewall, and means for retaining said skirt in substantially liquid tight engagement with an associated portion of said sidewall inner surface, a frustoconical paper wrap having a substantially uniform thickness and coaxially surrounding said sidewall, said wrap having an upper edge disposed substantially adjacent a lower portion of said bead and a lower edge in general registry with said bottom edge, a plurality of elongate shallow fluted indentations formed in the outer surface of said wrap and substantially equangularly spaced about the axis of said carrier, said wrap having a thickness greater than the depth of said indentations, each of said indentations extending in a direction defined by the intersection of an axial plane of said carrier and said wrap, said indentations being of substantially equal length and terminating in spaced relation to said upper and lower edges of said wrap, each of said indentations defining a corresponding longitudinally extending and inwardly directed rib projecting from the inner surface of said wrap and engaging said sidewall, adjacent ribs cooperating with associated upper and lower marginal portions extending between said adjacent ribs, an associated portion of the outer surface of the sidewall, and an associated portion of the inner surface of said wrap and defining a chamber between said wrap and said sidewall, and means for adhering the upper and lower marginal portions of said wrap to said sidewall, adjacent indentations cooperating with associated upper and lower marginal portions of said wrap extending between said adjacent indentations and bounding a portion of a surface of revolution defined by a smooth outer peripheral surface portion of said wrap, said outer peripheral surface portion having the general shape of an isosceles trapezoid.

11. Method for making a disposable biodegradable insulated container comprising the steps of providing a frustoconical biodegradable cup having an open upper end and a sidewall having a bottom edge and defining a substantially smooth outer surface, said sidewall having an annular bead defining the top edge of the sidewall and coaxially surrounding the open upper end of the container, cutting a substantially planar sheet of biodegradable material to form a blank including arcuate upper and lower edges having a common center of curvature and differing radii of curvature and radially extending opposite end edges, forming a plurality of spaced apart radially extending shallow indentations in one surface of the blank producing corresponding radially extending ribs projecting from the opposite surface of the blank, terminating the depressions and ribs in radially spaced relation to the upper and lower marginal edges of the blank, wrapping the blank around the cup bringing the ribs into contacting engagement with the outer surface of the sidewall and the lower edge into registry with the bottom edge, overlapping the opposite marginal end portions of the blank, adhering the overlapping marginal end portions in face-to-face relation to each other, and adhering the upper and lower marginal portions of the blank to the sidewall.

* * * * *